UNITED STATES PATENT OFFICE.

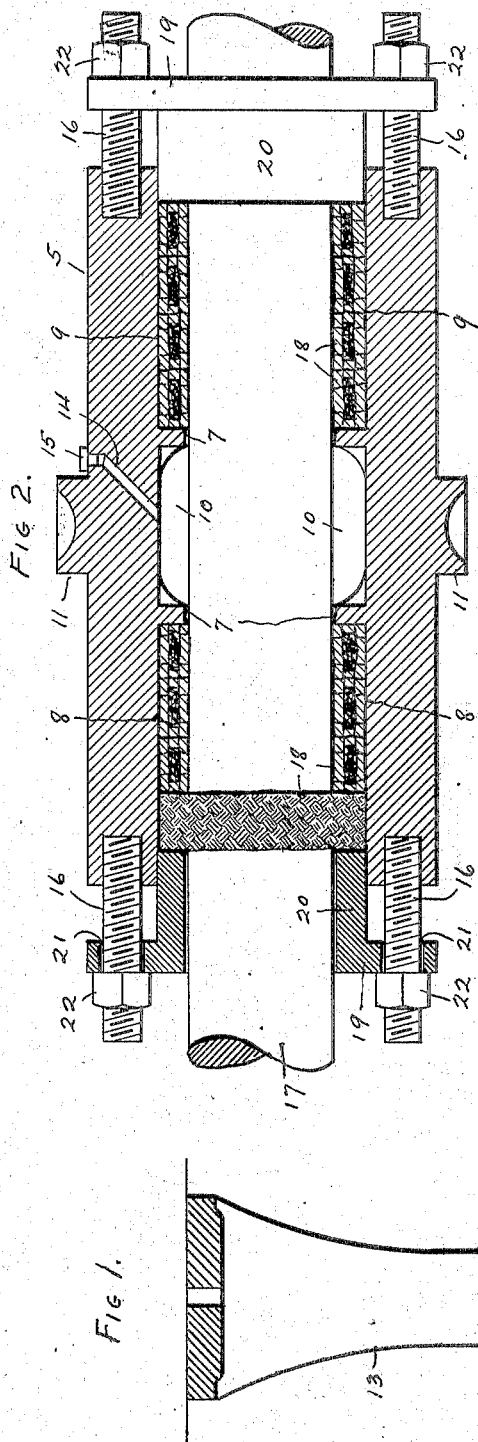
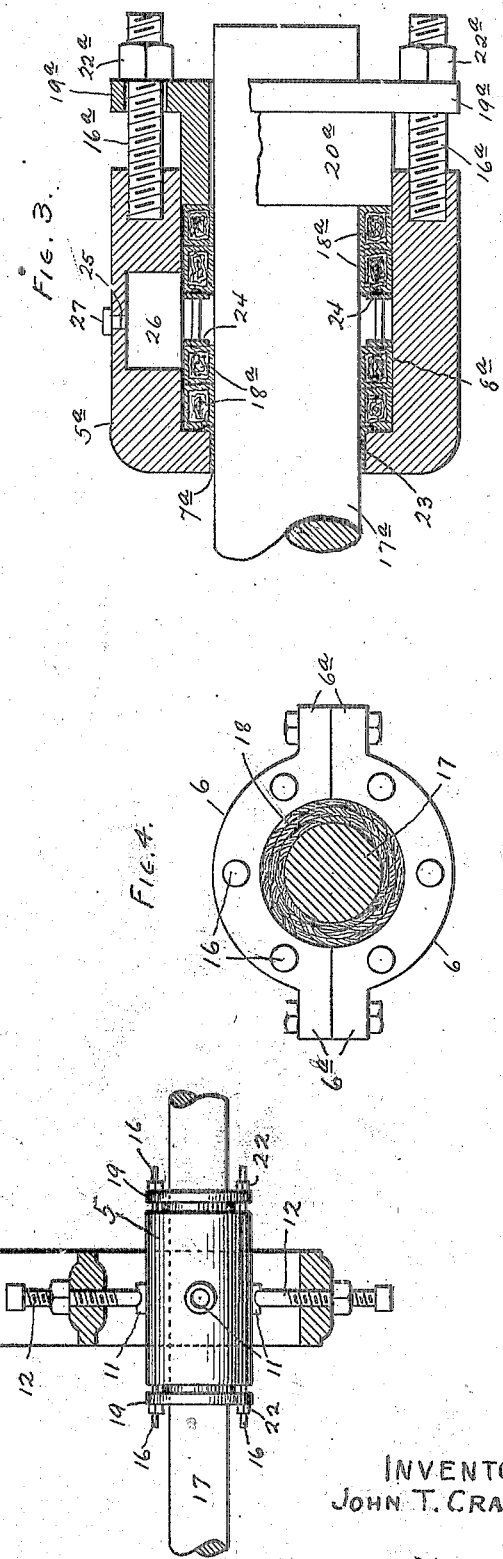

JOHN T. CRANE, OF MAYWOOD, ILLINOIS.

LINE-SHAFT BEARING.

1,345,534.  Specification of Letters Patent.  Patented July 6, 1920.

Application filed February 20, 1919. Serial No. 278,202.

*To all whom it may concern:*

Be it known that I, JOHN T. CRANE, a citizen of the United States, and a resident of Maywood, in the county of Cook and State of Illinois, have invented certain new and useful Improvements in Line-Shaft Bearings, of which the following is a specification.

My present invention relates to line shaft bearing and has special reference to the provision of such bearings which can be easily adjusted to secure the desired nicety of fit with the shaft with which they are to be associated; and which will also provide facilities for adjustment to take up wear resulting from the rotation of the shaft, and which will be adapted to receive and retain lubricant so that the lubricant will not drip nor be thrown from the bearing, thereby preventing the soilure which the lost lubricant would occasion, as well as effecting a material economy in the amount of lubricant required and also a saving in attention and time entailed in frequent lubrications. My improved bearing also excludes all dirt and grit from the bearing, an important advantage wherever the bearing may be used, but of very great advantage in industries in which the production of grit and dust is unavoidable.

As is well known, line shafting is mounted in bearings, and is either connected directly with a motor, or is driven by a belt running from the fly wheel of an engine to a pulley secured upon the shafting. In either case the efficiency of the arrangement depends largely upon the efficiency of the bearings in which the shaftings are mounted. The better present practice, so far as I am aware, is to provide bearing boxes, which are mounted in suitable hangers or brackets, and which bearing boxes are lined with cast segments of babbitt or other bearing metal. These segments have to be machined and scraped to secure the desired nicety of fit with the shaft, both when the bearings are originally installed, and whenever it is necessary to refit them to take up play occasioned by wear and this operation is of such nicety as to require some time, as well as a machinist of considerable ability.

I attain the above mentioned objects by means of the structure illustrated in the accompanying drawings, in which,—

Figure 1 is a view of a bearing embodying my invention, mounted in a drop-hanger bracket, the latter being in central vertical section.

Fig. 2 is a longitudinal central section of my improved bearing drawn to an enlarged scale.

Fig. 3 is a longitudinal central section of a slightly modified structure suitable for use at or near the end of a shaft when the same is closely connected with a motor or other source of power; and, Fig. 4 is an end elevation of my bearing made in semicylindrical segments to facilitate its installation and removal, the gland cap being removed.

In the drawings similar reference characters have been employed to designate the same parts throughout the several views.

My improved bearing consists of a shell or bearing box 5, which may be of an integral casting, as shown in Figs. 1, 2 and 3, or may be of two semicylindrical sections 6—6, provided with oppositely arranged lateral flanges 6ª, by means of which the segments are secured together, as shown in Fig. 4. The shell or bearing box 5, is provided with a central bore 7, of slightly greater diameter than the shaft for which the bearing is designed. At either end the bore is enlarged to provide annular chambers, 8, and 9, and intermediate the chambers 8 and 9, the central bore is also enlarged to provide an oil or lubricant chamber 10. At the longitudinal center of the shell or bearing box 5, may be conveniently provided, at the ends of both the horizontal and vertical diameters, exterior embossments 11, which are slightly concaved to receive the adjusting screws 12 of the hanger or bracket 13.

A lubricant channel 14, leading from the exterior of the shell or bearing box 5 to the lubricant chamber 10, is provided, through which the chamber may be filled, and a suitable closure 15 is provided for the outer end of the lubricant channel 14, to prevent the lubricant from being thrown therefrom by the revolution of the shaft. The ends of the casing or bearing box 5 are bored and tapped at preferably equally spaced points, and into these threaded bores are screwed the threaded studs 16. Within the annular chambers 8 and 9, and about the shaft 17, is placed suitable compressible packing 18, preferably an all metal packing made of bearing metal, such as is shown and described in my copending application, filed January 20, 1919, Serial Number 272,104. To close the ends of the chambers 8 and 9, and compress the packing about the shaft 17 to a sufficient extent to form a suitable bearing for the rotation thereof, as well as to prevent the escape of the lubricant, I provide the rings 19, having the annular tubular flanges 20, extending laterally from their inner peripheries, which flanges are proportioned to enter the packing chambers. The ring 19 is bored at 21 in registry with and to permit the passage of the studs 16, and nuts 22 are provided which coact with the studs to force the flanges 20 into the packing chambers and thereby compress the packing to the desired extent. A very much superior fit can be secured in this manner than can be obtained by the most expert machining and scraping of cast babbitt bearing linings, and anyone of any experience can adjust my bearing, thereby doing away with the services of an expert machinist.

In the modified construction shown in Fig. 3, which is designed for installation where there is not sufficient room at one end for adjusting the nuts 22, the casing 5ª is closed at one end, except for the central bore 7ª, for the passage of the shaft 17ª. It is desirable to make the bore 7ª somewhat larger than the diameter of the shaft and to press into this bore from the inside, a flanged bushing 23, of bronze or other suitable bearing metal to avoid scoring or grooving the shaft through contact with the metal of the casing or bearing box 5ª. In this form of bearing, except for the comparatively short distance where the bushing 23 is mounted, the entire bore is enlarged to form a packing chamber 8ª. In order to provide space for the lubricant, I provide a reticulated or cellular ring 24, the outer periphery of which is sufficiently small to enter the bore of the chamber 8ª and the interior periphery of which is larger than the diameter of the shaft 17ª. In assembling this form of bearing, packing 18ª, such as has already been referred to, is first inserted into the chamber 8ª; the lubricant receiving ring 24 is next inserted and then more packing, and the whole is compressed by means of a ring 19ª having a flange 20ª in connection with threaded studs 16ª and nuts 22ª, in all respects similar to the construction heretofore described. Lubricant is fed to the lubricant receiving ring 24, through an oil hole 25, which communicates with the interior of the chamber 8ª through a narrow slot 26, extending longitudinally of the casing 5ª so as to more certainly effect communication with the lubricant receiving ring 24, in whatever position it assumes by reason of the compression of the packing. A closure 27 is provided for the oil hole 25.

What I claim as new is:—

1. A bearing for rotating shafting comprising a casing having a bore therein for the passage of a shaft, said bore being of greater diameter than the shaft, said bore having a central enlargement providing a lubricant receiving chamber and enlargements at opposite ends providing terminal chambers upon opposite sides of said lubricant chamber, compressible packing disposed within said terminal chambers, rings adapted to surround the shaft and having laterally extending annular flanges adapted to enter said terminal chambers, and means for drawing said rings toward the ends of said casing thereby forcing said flanges within said terminal chambers to compress said packing so as to suspend the shaft within said bore solely upon said packing.

2. A bearing for rotating shafting comprising a casing having a bore therethrough for the passage of a shaft, said bore being of greater diameter than the shaft, said bore being enlarged to provide a chamber, lubricant containing means disposed intermediate the ends of said chamber, compressible packing disposed within said chamber upon opposite sides of said lubricant containing means, and means for compressing said packing to contact and form a bearing for a shaft passing through said bore whereby said packing provides the sole contacting means for the shaft.

3. A bearing for rotating shafting comprising a casing having a bore larger than the shafting to be accommodated therein, said bore having an annular enlargement, compressible packing disposed within said annular enlargement, lubricant receiving means disposed adjacent said bore and intermediate said compressible packing and means for compressing said packing to cause the same to protrude beyond the line of the wall of said bore and form the only bearing for shafting disposed therein.

4. A bearing box for rotating shafting comprising a casing having a bore larger in diameter than the shafting to be accommodated therein, said bore being provided with an enlargement constituting a chamber adapted to receive compressible packing, and means for compressing packing disposed in said chamber so as to cause the same to protrude beyond the line of the wall of the bore of said casing and form the sole bearing for shafting passing therethrough.

5. A bearing box for rotating shafting comprising a casing having a bore of greater diameter than the shaft to be accommodated therein and said bore being enlarged to provide a lubricant chamber, packing chambers upon opposite sides of said lubricant chamber, packing disposed in said packing chambers, longitudinally movable collars entering the ends of said casing the central openings whereof are greater than the diameter of and out of contact with the shafting, and means for moving said collar against said packing whereby the latter is compressed against the shaft to suspend the shaft out of engagement with the other elements of said structure and thereby provide the sole bearing for the shaft.

Signed at Chicago, county of Cook and State of Illinois, this 14th day of February 1919.

JOHN T. CRANE.

Witnesses:
E. K. LUNDY, Jr.,
BENJ. T. ROODHOUSE.